Patented Feb. 19, 1929.

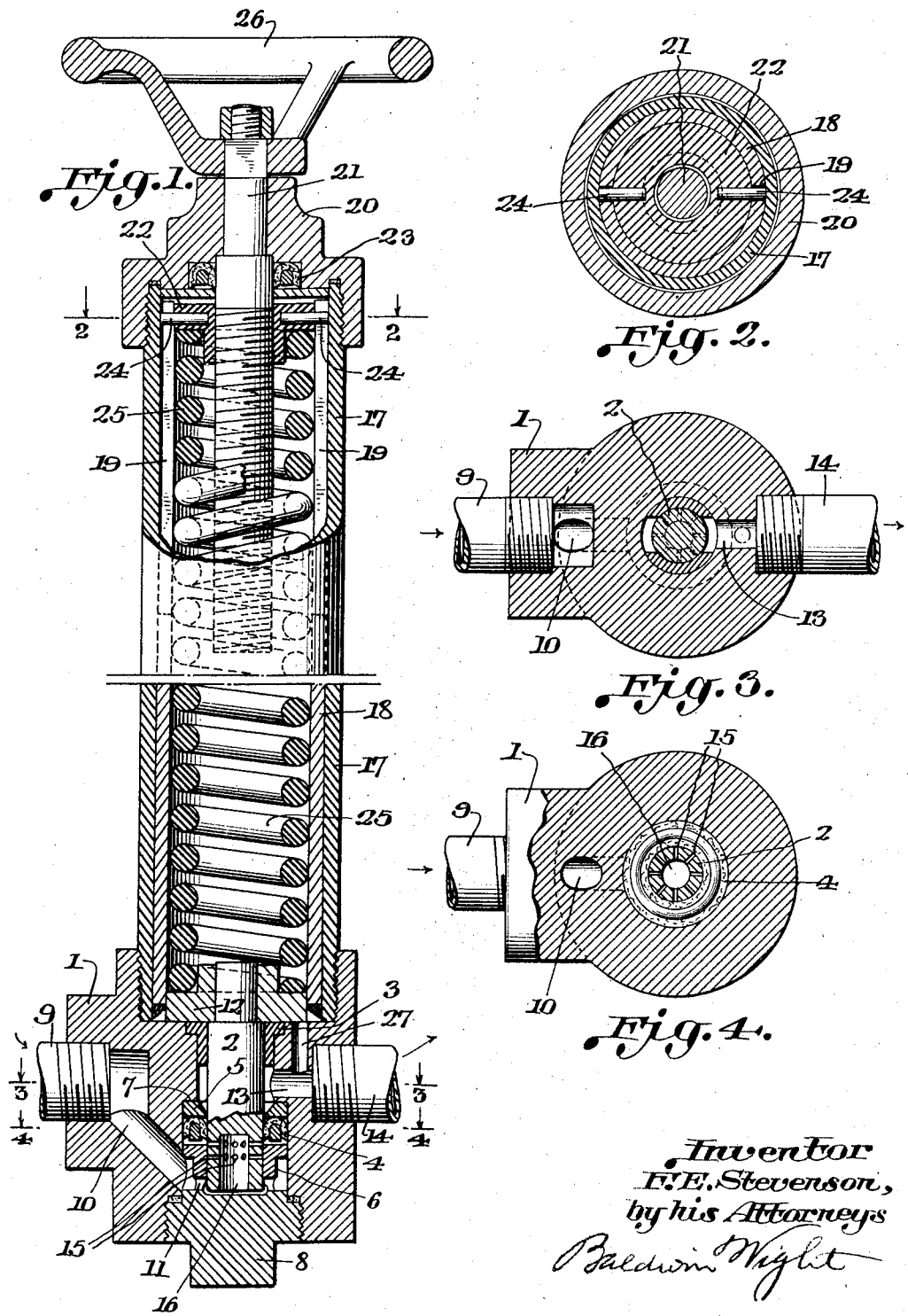

1,702,550

UNITED STATES PATENT OFFICE.

FRANCIS E. STEVENSON, OF MOUNT GILEAD, OHIO, ASSIGNOR TO THE HYDRAULIC PRESS MANUFACTURING COMPANY, OF MOUNT GILEAD, OHIO.

HYDRAULIC REDUCING VALVE.

Application filed April 20, 1925. Serial No. 24,448.

This invention relates to a hydraulic reducing valve wherein a high pressure on one side of the valve is reduced to a low pressure on the other side. Many attempts have been made to use hydraulic reducing valves but in practically every case they have failed because the gradual discharge of liquid through the valve has caused it to readily cut out. Such valves have been made with metallic surfaces seating together which may be satisfactory for low pressures in water, steam or air but do not prove satisfactory for high pressures which cut out the metal seats.

An object of the invention is to produce a hydraulic reducing valve which will be free from all of the objections of previous valves for this purpose and will enable a high pressure of 2000 pounds or over to be reduced to 500 pounds or less without difficulty. The features of construction which permit the attainment of this result will be set forth in detail in the specification and included in the appended claim.

In the drawings:

Figure 1 is a longitudinal section through the valve.

Figure 2 is a cross section on the line 2—2 of Figure 1.

Figure 3 is a cross section on the line 3—3 of Figure 1.

Figure 4 is a cross section on the line 4—4 of Figure 1.

The valve comprises a body member 1 in which works a slidable plunger 2 which is guided by a guide ring 3 and by a packing preferably of U-shape leather 4 lying between rings 5 and 6. A shoulder 7 on the body forms a seat for the ring 5 and a screw plug 8 threaded into the body 1 presses the ring 6 against the packing. This construction permits the packing and plunger to be readily removed if necessary for the purpose of replacing the packing.

On one side of the body an inlet 9 for high pressure communicates by an inclined passage 10 and openings 11 through the ring 6 with a central chamber 16 in the end of the plunger 2 from which chamber radiate a plurality of small ports 15 which pass through the plunger. The inner end of the plunger is provided with a shoulder which rests against a nut 12 which is forced outwardly by a spring as hereinafter described and therefore tends to resist the inward movement of the plunger. A chamber 13 within the body 1 communicates with an outlet 14 on the low pressure side of the valve. The ports 15 are adapted to open communication into the chamber 13 when the plunger is forced inwardly a sufficient extent.

Screw threaded into the body 1 is a casing 17 to which is welded or otherwise fastened an inner shell 18 preferably of non-corrosive metal and having two diametrically opposed slots extending through the walls thereof a considerable distance from the outer end. A cap 20 is screw threaded on the outer end of the casing 17 and through this cap passes a stem 21 which is screw threaded on its inner end to engage a nut 22. Suitable packing 23 is provided for this stem. Pins 24 carried by the nut 22 have their ends projecting into the slots 19 and thereby prevent relative rotation between the nut and the inner shell 18 which is fast with the casing 17. A spring 25 rests at one end against the nut 12 and at its other end against the nut 22. The stem 21 is provided with a hand wheel 26 by which it may be rotated and since the nut 22 cannot rotate with the stem 21 the rotation of the hand wheel will cause the nut 22 to move longitudinally of the casing and thereby place the spring 25 under a greater or less tension.

A passage 27 affords communication between the chamber 13 and the interior of the casing 17 when the plunger 2 is moved inward sufficiently to lift the nut 12 off of its seat on the body and thus open the communication, it being understood that the interior of the casing 17 is always under more or less pressure by reason of the fluid entering between the nut 12 and shell 18, and around the plunger 2. This construction renders it unnecessary to have any packing in the upper end of the plunger 2 which would be necessary if the spring were not to be exposed to fluid under pressure since the plunger cannot have a tight fit in the nut or guide ring 3.

The valve opens in the following manner. The high pressure which enters through the inlet 9 and passage 10 is applied to the plunger within the chamber 16 and also across the end of the plunger. This pressure being greater than that of the spring 25 moves the plunger inward. As soon as the ports 15 pass beyond the packing and open communication with the chamber 13 the fluid will pass therethrough and through the passage 27 into the spring chamber thus affording a back pressure upon the plunger in addition to the pressure of the spring. The pressure on the two sides of the plunger will therefore tend to arrive at a balance and it is evident that the pressure at the low pressure outlet 14 will be equal to the high pressure minus the pressure applied by the spring. If the high pressure is raised or lowered to remain high enough to be effective, there will also be a fluctuation in the amount of the low pressure since this is controlled by the difference between the high pressure and the tension of the spring.

One unique feature of the valve cut off is that the plunger 2 does not rise to one height and gradually allow the water to cut across the packing 4. This packing seals the ports 15 until at least one row of them is entirely above the leather packing. Then as the pressure builds up at the upper end of the plunger and it begins to move back to the original position the fluid will continue to flow through the holes until they are below the sharp edge of the ring 5 of the packing. If there is a gradual demand on the low pressure side, the plunger does not remain in one position, but will oscillate on the short stroke just long enough to allow the small ports to come first above the leather packing and then below it. This small movement does not greatly change the spring load since the spring is long and the deflection is divided between the coils. The variation in the low pressure will therefore be very slight.

It will be obvious that the tension of the spring may be readily adjusted as desired to meet varying conditions and that by removal of the screw plug 8 the plunger and packing can be readily removed for the purpose of installing new packing when necessary. No grinding of any valve surfaces is necessary and no wear comes thereon. The packing itself will have a relatively long life because of the particular character and peculiar action of the valve.

It is obvious that various detail changes may be made without in any way departing from the spirit of the invention, which is to be regarded as limited only by the scope of the appended claim.

I claim as my invention.

A hydraulic reducing valve comprising a body member having a passageway therethrough; a high pressure inlet at one side of the body and in communication with the passageway; a low pressure outlet at the other side of the body and communicating with the passageway, said passageway including a longitudinal bore having a shoulder and connected at its lower end with the high pressure inlet by an inclined passage and intermediately connected with the low pressure outlet by a chamber having a longitudinal port extending to the top of the body member; a plunger mounted to reciprocate under pressure in the bore and extending above the body, said plunger having an open-ended chamber in its lower end provided with open radial ports; a gland surrounding the plunger and bearing upwardly against the shoulder, said gland normally closing said radial ports; a tubular casing extending upwardly from the body; a nut carried by the plunger within the casing and normally resting on the body to close the longitudinal port; a spring mounted within the tubular casing and bearing at one end against the nut; a head for sealing the free end of the casing and bearing on the opposite end of the spring; means carried by the head for adjusting the tension on the spring to resist the plunger when the pressure raises same to bring the radial ports opposite the outlet chamber.

In testimony whereof, I have hereunto subscribed my name.

FRANCIS E. STEVENSON.